United States Patent
Terpstra

(10) Patent No.: US 10,361,901 B2
(45) Date of Patent: *Jul. 23, 2019

(54) REGISTRATION OF SIP-BASED COMMUNICATIONS IN A HOSTED VOIP NETWORK

(71) Applicant: LEVEL 3 COMMUNICATIONS, LLC, Broomfield, CO (US)

(72) Inventor: Richard Dean Terpstra, Superior, CO (US)

(73) Assignee: Level 3 Communications, LLC, Broomfield, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 15/996,855

(22) Filed: Jun. 4, 2018

(65) Prior Publication Data

US 2018/0287849 A1 Oct. 4, 2018

Related U.S. Application Data

(63) Continuation of application No. 15/714,521, filed on Sep. 25, 2017, now Pat. No. 9,992,052, which is a continuation of application No. 13/801,398, filed on Mar. 13, 2013, now Pat. No. 9,774,486.

(60) Provisional application No. 61/770,791, filed on Feb. 28, 2013.

(51) Int. Cl.
*H04L 29/06* (2006.01)
*H04L 29/12* (2006.01)

(52) U.S. Cl.
CPC .... *H04L 29/06333* (2013.01); *H04L 65/1006* (2013.01); *H04L 65/1046* (2013.01); *H04L 65/1073* (2013.01); *H04L 61/1529* (2013.01); *H04L 61/2564* (2013.01)

(58) Field of Classification Search
CPC .......... H04L 29/06333; H04L 65/1006; H04L 65/1073; H04L 65/1046; H04L 61/1529; H04L 61/2564

See application file for complete search history.

(56) References Cited

U.S. PATENT DOCUMENTS

| | | | | |
|---|---|---|---|---|
| 8,125,999 B2* | 2/2012 | Yasrebi | ............. | H04L 29/12028 370/401 |
| 8,184,530 B1* | 5/2012 | Swan | ................... | H04W 76/12 370/230 |
| 2003/0161296 A1* | 8/2003 | Butler | ..................... | H04L 29/06 370/352 |
| 2006/0013147 A1 | 1/2006 | Terpstra et al. | | |

(Continued)

OTHER PUBLICATIONS

Extended European Search Report, dated Jul. 25, 2016, Application No. 14756759.8, filed Feb. 28, 2014; 8 pgs.

(Continued)

*Primary Examiner* — Ajay Cattungal

(57) ABSTRACT

Aspects of the present disclosure involve systems, methods, computer program products, and the like, for implementing a registrar component or functionality in a telecommunications network. In one implementation, the registrar functionality is handled at a Session Border Controller (SBC) or Network Address Translation (NAT) Traversal Manager (NTM) device of the network to alleviate an application server of the network from performing the registration function.

14 Claims, 5 Drawing Sheets

(56) References Cited

U.S. PATENT DOCUMENTS

| | | | |
|---|---|---|---|
| 2007/0104183 A1* | 5/2007 | Bakke | H04L 65/1073 370/352 |
| 2009/0238174 A1* | 9/2009 | Veenstra | H04L 65/1073 370/352 |
| 2011/0113141 A1* | 5/2011 | Veenstra | H04L 63/123 709/226 |
| 2014/0241341 A1 | 8/2014 | Terpstra | |
| 2018/0013609 A1 | 1/2018 | Terpstra | |

OTHER PUBLICATIONS

International Preliminary Report on Patentability, dated Sep. 1, 2015, Int'l Appl. No. PCT/US14/019452, Int'l Filing Date Feb. 28, 2014; 9 pgs.

International Search Report, dated Apr. 15, 2014, Int'l Appl. No. PCT/US14/019452, Int'l Filing Date Feb. 28, 2014; 7 pgs.

Written Opinion of the International Searching Authority, dated Apr. 15, 2014, Int'l Appl. No. PCT/US14/019452, Int'l Filing Date Feb. 28, 2014; 7 pgs.

* cited by examiner

REGISTRATION OF SIP-BASED COMMUNICATIONS IN A HOSTED VOIP NETWORK

CROSS-REFERENCE TO RELATED APPLICATIONS

This application is a continuation of and claims the benefit of priority from U.S. patent application Ser. No. 15/714,521, titled "REGISTRATION OF SIP-BASED COMMUNICATIONS IN A HOSTED VOIP NETWORK," filed Sep. 25, 2017, the entire contents of which are fully incorporated by reference herein for all purposes. Application Ser. No. 15/714,521 is a continuation of and claims the benefit of priority from U.S. patent application Ser. No. 13/801,398, titled "REGISTRATION OF SIP-BASED COMMUNICATIONS IN A HOSTED VOIP NETWORK," filed Mar. 13, 2013, the entire contents of which are fully incorporated by reference herein for all purposes. Application Ser. No. 13/801,398 claims the benefit of priority from U.S. Provisional Patent Application No. 61/770,791, titled "REGISTRATION OF SIP-BASED COMMUNICATIONS IN A HOSTED VOIP NETWORK," filed Feb. 28, 2013, the entire contents of which are fully incorporated by reference herein for all purposes.

BACKGROUND

Telecommunication networks provide for the transmission of information across some distance through terrestrial, wireless or satellite communication networks. Such communications may involve voice, data or multimedia information, among others. In addition, telecommunication networks often offer features and/or services to the customers of the network that provide flexible and varied ways in which the communications are transmitted over the network. For example, some telecommunication networks provide communication features such as call waiting, call forwarding, voicemail and the like, known as Class 5 telecommunication services.

In many network configurations, especially those including Voice over Internet Protocol (VoIP) capabilities, certain of the Class 5 capabilities of the network are handled and provided by an application server associated with the network. To provide these features to an end user of the network, the application server is typically aware of when the end user is connected to the network and to where such services are transmitted when requested by the end user. To facilitate this, end users of a network typically register with the network when connected.

It is with these and other issues in mind, among others, that various aspects of the present disclosure were conceived and developed.

SUMMARY

One implementation of the present disclosure may take the form of a system for transmitting one or more communications in a telecommunications network. The system comprises an application server configured to provide one or more services to at least one user of a telecommunications network, the at least one user associated with at least one end user device configured to transmit and receive communications from the telecommunications network, a session border controller device in communication with the application server and the at least one end user device and a registrar module integrated into the session border controller device. Further, the registrar module is configured to receive one or more registration messages from that at least one end user device in communication with the session border controller device and register the at least one end user device with the telecommunications network.

Another implementation of the present disclosure may take the form of a method for registering an end user to a telecommunications network. The method includes the operations of receiving, at a session border control device of a telecommunications network, a Session Initiation Protocol (SIP) based registration message from an end user device associated with a customer to the telecommunications network, the registration message comprising an Internet Protocol (IP) address associated with the end user device, creating an entry in a registration database associated with the end user device, the entry comprising the IP address and an identification of the customer and transmitting one or more acknowledgement messages to the end user device upon receiving the registration message from the end user device.

Yet another implementation of the present disclosure may take the form of a telecommunications network. The network comprises at least one telecommunications network device including one or more communication ports connected to an application server of a telecommunications network, a computer-readable medium storing one or more computer-executable instructions and a processor in communication with the computer-readable medium. Further, when executing the one or more computer-executable instructions, is configured to perform the operations of, receiving a Session Initiation Protocol (SIP) based registration message from an end user device of the telecommunications network through a communication port, the registration message comprising an Internet Protocol (IP) address associated with the end user device, creating an entry in a registration database associated with the end user device, the entry comprising the IP address, an identification of the customer and an expiration value indicating a time limit for maintaining the entry and transmitting one or more acknowledgement messages to the end user device upon receiving the registration message from the end user device.

DETAILED DESCRIPTION

Aspects of the present disclosure involve systems, methods, computer program products, and the like, for implementing a registrar component or registrar functionality in a telecommunications network. More particularly, in some network configurations, especially those including Voice over Internet Protocol (VoIP) capabilities, certain Class 5 capabilities of the network are handled and provided by an application server associated with the network. To provide such features, the application server may provide a registrar module configured to register for the one or more end users associated with that application server so that the application server is aware of the end user on the network. For example, in a network utilizing a SIP-based communications scheme, the application server may accept the SIP register message from the end user device and process the register message to register the end user's Internet Protocol (IP) address with the application server. However, such registration functions of the registrar module of the application server may overload the application server such that the Class 5 features offered by the application server are hindered. In one implementation of the present disclosure, the registrar functionality is handled at a Session Border Controller (SBC) or Network Address Translation (NAT) Traversal Manager (NTM) device, thereby alleviating the application server from performing the registration function such that the application server can provide the Class 5 features to the end user more robustly. In addition, as a single application server can provide services to many associated SBC devices and end users, relocation of the SIP registrar functionality to the SBC devices spreads the additional processing and traffic from the application server to the SBC devices.

Figure 1:
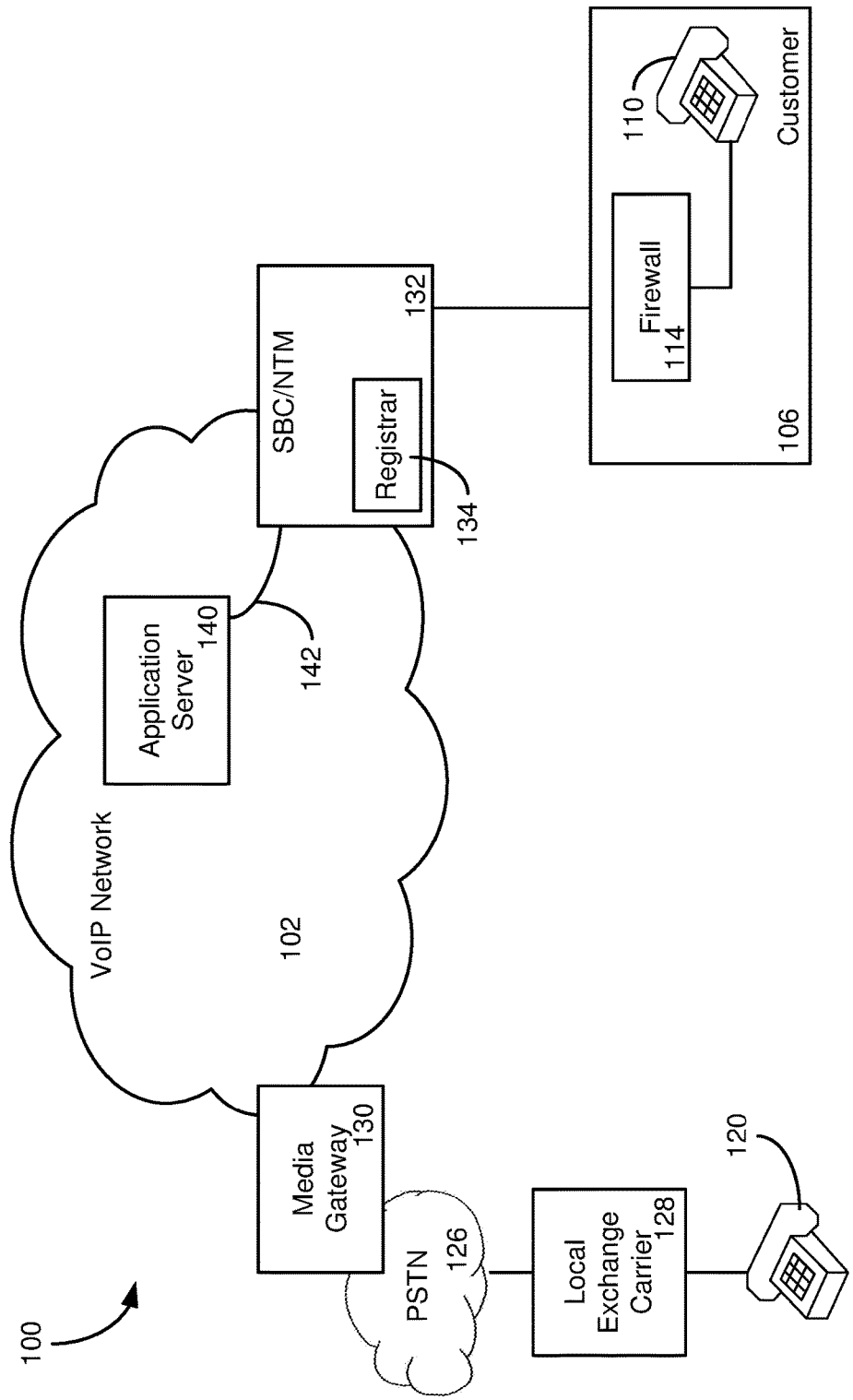
FIG. 1 schematic diagram illustrating an exemplary Voice over Internet Protocol (VoIP) operating environment which may be used in implementing embodiments of the present disclosure.

FIG. 1 illustrates a portion of an exemplary operating environment 100 for implementing registrar functionality of the network in an SBC or NTM device of the network. The environment 100 provides for setting up one or more Voice over Internet Protocol (VoIP) communication sessions between network users using some communication scheme, such as Session Initiation Protocol (SIP). With specific reference to FIG. 1, the environment 100 includes a VoIP network 102 provided by a wholesale network service provider. The VoIP network 102 includes numerous components such as, but not limited to, gateways routers which enable communication across the VoIP network 102, but are not shown or described in detail here because those skilled in the art will readily understand these components. Additional components include at least one SBC and/or an NTM device and an application server, described in more detail below. Also relevant to this description is the interaction and communication between the VoIP network 102 and other entities, such as the one or more customer home or business local area networks (LANs) 106.

Customer network 106 can include communication devices such as, but not limited to, a personal computer, fax machine, or a telephone 110 connected to a router/firewall 114. Some examples of the end user communication device 110 include an IP-enabled telephone, cellular telephone, laptop computer, fax machine and the like. The communication and networking components of the customer network 106 enable a user at the customer network to communicate via the VoIP network 102 to other communication devices, such as another customer network and/or an analog telephone 120. Components of the customer network 106 are typically home- or business-based, but they can be relocated and may be designed for easy portability. For example, the telephone 110 may be wireless (e.g., cellular).

The customer network 106 typically connects to the VoIP network 102 via a session border controller (SBC) device or Network Address Translation (NAT) Traversal Manager (NTM) device 132. Although discussed herein as an SBC, the embodiments discussed apply to either an SBC device or NTM device. The SBC 132 connects the customer network 106 to the VoIP network 102. In general, the SBC 132 is a device deployed within the network 102 to control signaling involved in setting up and tearing down communications between the end user and the network. In the particular network configuration shown in FIG. 1, SBC 132 connects or otherwise communicates with an application server 140 through a trunk group 142 connection, discussed in more detail below. Although a single telephony device 110 is shown in FIG. 1, it should be appreciated that several such devices may be connected to and associated with the SBC 132 through firewall 114. Similarly, although only one SBC 132 is shown in FIG. 1, it should be appreciated that several SBC devices may provide a gateway to the network for several other customer networks 106 and may be connected to and associated with the application server 140. In this manner, the application server provides services and functionality to many end user devices 110 through any number of connected SBC's 132.

The analog telephone 120 accesses, and is accessed by, the VoIP network 102 via a public switched telephone network (PSTN) 126 and a local exchange carrier (LEC) 128. Communication via any of the networks can be wired, wireless, or any combination thereof. Additionally, the PSTN 126 may communicate, in some embodiments, with the VoIP network 102 through a media gateway device 130.

As discussed above, one or more trunk connections may connect the SBC 132 and border media gateway device 130 to the VoIP network 102. In general, a trunk is a transmission channel between two points, typically between two networks to carry communications between the networks. In an Internet Protocol (IP) environment, the trunks provide the IP interconnect between the SBC 132 and the VoIP network 102. To facilitate this interconnect, one or more IP addresses are shared between the SBC and the VoIP network. The IP addresses allow for the communications transmitted between the SBC 132 and the network 102 to be addressed and sent to the correct network device. In addition, several trunks may be connected to the SBC 132 such that the SBC device may receive communications from several customers to the network 102.

At a high level, the SBC 132 is involved, along with the application server 140, in processing a VoIP call to or from an end user device. Through this configuration, the network provides enterprise services and, specifically, SIP trunking services to the end users of the network. The term "SIP trunking services" refers to the use of VoIP and the SIP protocol to provide telecommunication services between customers of the network 102. The application server 140 provides several of the enterprise services including call waiting, call forwarding, call transfer, etc. for the customers 110 of the network. To facilitate the services provided by the application server 140 to the end users 110, the end user device is typically registered with the application server through one or more SIP-based registration messages. Once registered with the application server 140, the server can direct calls and services to the proper end user through the trunk group connection 142 and SBC 132 of the network.

SIP-based registration generally utilizes a registrar module 134 that registers an end user device 110 with the network. In particular, the end user device 110 typically sends a SIP Register request message to the registrar 134. The Register request message typically includes an IP-address so that the network can properly route calls and services to an end used located at the particular IP address. To facilitate the registration of the end user, the registrar 134 maintains a database of registered devices and the IP-address associated with each registered device for reference during directing communications and services to the end user device. One or more Acknowledgement messages may also be transmitted between the end user device 110 and the registrar 134 during the registration process. In addition, each registration stored by the registrar 134 may include an expiration value that creates a time limit to the duration of the registration such that expiration of the time limit causes the registrar to remove registration information for that end user. Thus, the end user device 110 sends periodic registration message to the registrar 134 to refresh the registration information maintained by the registrar. In the absence of a refresh message, the registrar 134 deletes the registration information for the end user 110.

Once the end user 110 is registered by the registrar 134, the end user receives and transmits messages across the network 102. In particular, the end user device 110 receives communications at the IP-address associated with the end user device 110. To initiate a communication, the end user device 110 transmits an SIP Invite message to the application server 140 that is then processed by the network 102. In one embodiment of the present disclosure, the registrar 134 requests an authentication of the end user device 110 that transmitted the invite message. The authentication process may include the registrar 134 transmitting an authenticate message to the end user device 110 and, in return, the end user device 110 transmits verification of the end users IP-address that the application server 140 may then authenticate with the registration information stored in the registrar 134.

As discussed above, each of the registrar 134 functionalities are typically implemented by the application server 140. However, in one embodiment discussed herein, the registrar 134 functions for the SIP registration process are instead implemented by the SBC device 132.

Figure 2:
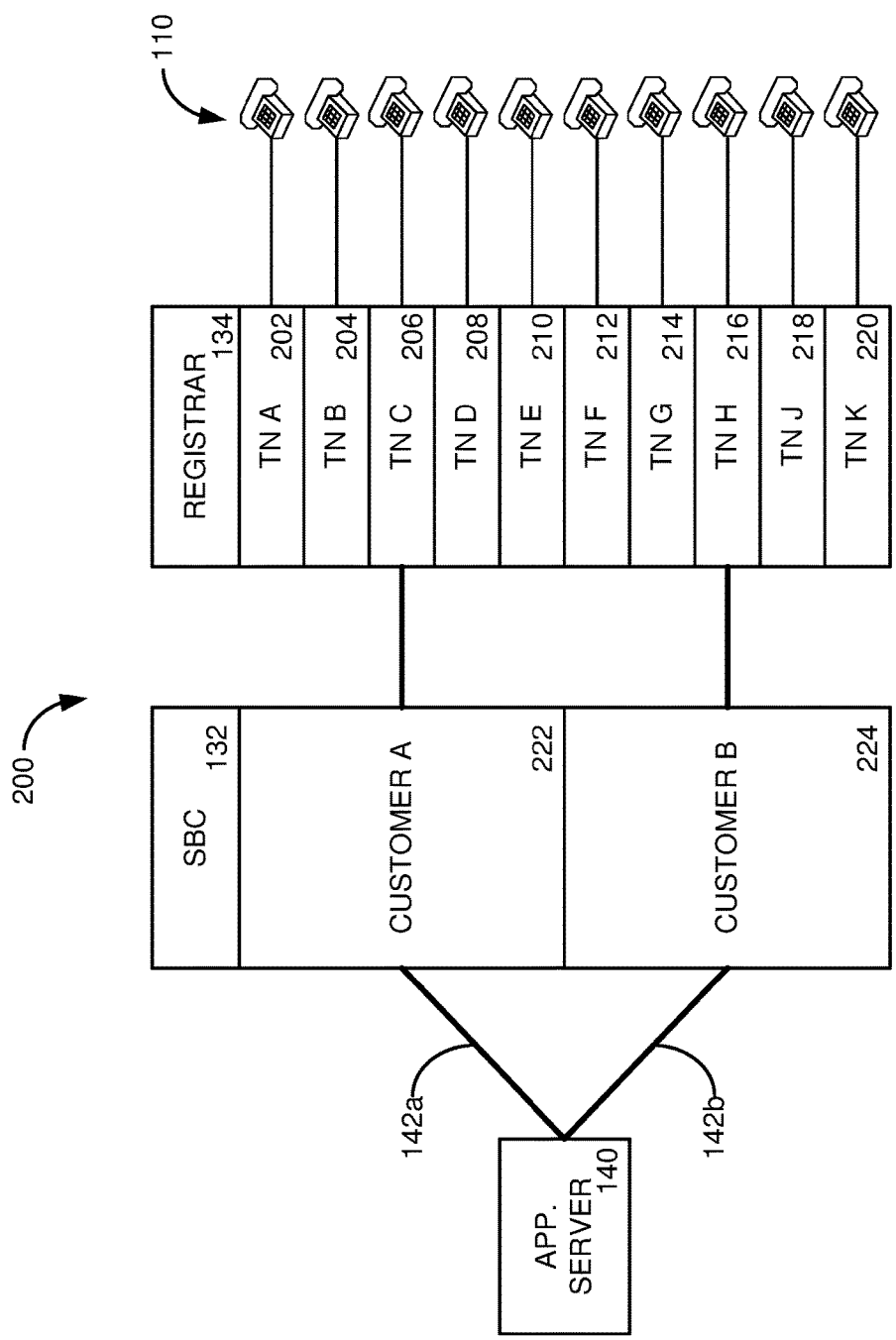
FIG. 2 is a schematic diagram illustrating a portion of a first exemplary VoIP network incorporating a session border controller unit configured to receive and manage registration messages from one or more endpoints to the network.

FIG. 2 is a schematic diagram illustrating a portion of a first exemplary VoIP network 200 incorporating a SBC unit 132 configured to receive and manage registration messages from one or more endpoints to the network. The application server 140, SBC 132 and end user devices 110 shown in FIG. 2 are the same or similar to the corresponding components illustrated in the network of FIG. 1 and discussed above. Thus, the application server 140 is connected to the SBC 132 through the trunk group connections 142a, 142b. Also, although illustrated as separate from the SBC 132 in FIG. 2, registrar 134 may be incorporated into or otherwise associated with the SBC. Thus, the SBC 132 may be configured to perform one or more of the functions of the registrar module 134. Also, for simplicity, the firewall/router 114 is not illustrated between the end user devices 110 and the registrar 134 although such a device may be present.

As shown in FIG. 2, the registrar 134 and SBC 132 supports and receives communications from ten end user devices 110. As should be appreciated, fewer or more end user devices 110 may be supported by the SBC 132, although not illustrated in FIG. 2. In general, each end user device 110 is assigned a telephone number (TN), illustrated in FIG. 2 as TN A 202 through TN K 220. Each TN 202-220 associated with SBC 132 and registrar 134 may also be associated with one or more IP-addresses such that communications intended for one TN may be properly routed to the end user device 110 associated with the TN by the network 200 through the associated IP-address. Further, although the network 200 of FIG. 2 utilizes TN's, any unique identifier may be used to identify the end user devices 110 for the registration of the devices.

The SBC 132 illustrated in FIG. 2 is configured to support any number of customers to the network, shown in FIG. 2 as customer A 222 and customer B 224. Although SBC 132 is shown supporting two customers, the SBC may support communications for any number of customers. As configured, each customer 222, 224 is provided with a trunk group 142a, 142b connecting the SBC 132 to the application server 140. In particular, customer group A 222 communicates with application server 140 through trunk group 142a and customer group B 224 communicates with application server through trunk group 142b. Further, the TN's (and IP-addresses) associated with the SBC 132 may be divided between the customers to the SBC. For example, customer A 222 may be assigned TN A 202 through TN E 210, while customer B 226 may be assigned TN F 212 through TN K 220. Further, providing a trunk group connection 142a, 142b for a customer of the SBC 132 to support a plurality of TN's creates an enterprise-type network for the customer supported through the trunk group connection. In this manner, communications transmitted to and from the end user devices 110 are provided through the application server 140.

As mentioned, the registrar 134 component illustrated in FIG. 2 may be implemented within the SBC 132 device, although it is not required. Thus, during activation of an end user communication device 110 to the network, the device would transmit a SIP-based register request message to the registrar 134. For example, a register request message may be received for the end user device associated with TN A 202. The request message generally includes an IP-address to which the end user device 110 is connected. Upon receipt, the registrar 134 adds the IP-address of the end user device and associates the received IP-address with the TN and the end user device 110. For example, the registrar 134 maintains a list that may include an IP-address for TN A 202 when an end user device is connected at TN A. In addition, one or more acknowledgement messages may be transmitted between the registrar 134 of the SBC 132 and the end user device 110. Also, the end user device 110 may transmit one or more refresh messages to the registrar 134 to maintain the TN information in the database of the registrar as long as the end user device is connected to the TN. Such refresh messages may also maintain a firewall pin hole between the SBC 132 and the end user device 110. In this manner, the registrar 134 of the SBC 132 provides the functionality of registering the one or more end user devices and TN's of the network 200. Further, as mentioned above, the registrar functionality may be incorporated into the SBC 132 such that the SBC and the registrar 134 occur in the same device.

The SBC 132 and registrar 134 may also provide registration functions when an end user device 110 is transmitting a communication through the network 200. As mentioned above, the end user, the end user device 110 may transmit an invite message to the SBC 132 for transmission to the application server 140 to transmit a message across the network 200. However, in a previous configuration where the SBC 132 and the registrar 134 are separate entities, the end user device 110 typically maintains two IP-addresses, one for the SBC 132 to which invite messages are transmitted and one for the registrar 134 to which registration messages are transmitted. Thus, by combining the registrar functionality with the SBC 132, the end user device 110 may transmit both registration messages and invite messages to the same IP-address, namely that of the SBC. Further, the registrar 134, associated with the SBC 132, may conduct the authentication process with the end user device upon receipt of an invite message at the application server, thereby removing some messaging to the application server 140. In another embodiment, the registrar 134 provides a proxy service for the end user device 110 to receive the invite message and forward the message to the SBC for processing in the network.

In addition, one embodiment of the VoIP network 200 provides for the registration of multiple end user devices through a single registration. Such a system is described in U.S. Pat. No. 7,440,455, the entirety of which is incorporated herein by reference. As described, multiple end user devices are registered with a network through a bulk registration. Thus, as applied to the present disclosure, the SBC 132 may receive a bulk registration request to register multiple end user devices under the same registration. The registration of the bulk end user devices occurs in the same manner as described herein. Thus, the SBC 132 of the network 200 may register several end user devices as a single registration to determine when the bulk end user devices are connected to the network.

The particular configuration illustrated in FIG. 2 removes the need for the application server to provide the registrar functionality of the network 200. Providing for the registrar 134 to be located at the SBC 132 level of the network provides several advantages over having the application server 140 perform such functions. For example, in this configuration, the application server 140 can be programmed statically with the TN's associated with the SBC 132. Thus, rather than dynamically changing the TN's and end users associated with a particular SBC as new end users are registered with the application server 140, the application server can be programmed with all possible TN's assigned to an SBC and allow the SBC to handle the presence of the end user devices. Further, because the application server 140 is freed from handling the registration process of the end user devices 110, the application server can perform other functionalities typically assigned to the server. Thus, fewer application servers 140 may be required to provide the needed services to the end users of the network, thereby lowering the overhead cost of the total network.

Another advantage gained through the configuration described herein is realized during the failure of one or more components of the network 200 or one or more customer networks connected to the network. For example, an SBC 132 of a network 200, or an IP customer network associated with the SBC, may fail or need to be rebooted during operation of the device. However, upon start up or rebooting of the customer network, each end user device 110 connected to the SBC may attempt to re-register with the network 200. If the registrar functionality is handled by the application server 140, the application server may become overwhelmed with the registration process of each end user device occurring at one time. As a result, the other functions provided by the application server 140 may be impaired or may not be performed until each registration request is handled. Because several SBC devices 132 (and subsequently several end user devices 110) may be connected to an application server, the other SBC devices may suffer service loss or degradation while the rebooting SBC goes through the registration process. A similar degradation of the features provided by the application server 140 may occur during a malicious application connected to the network sending multiple registration requests to the network. Further, in the situation where several SBC's 132 connected to the same application server or several customer networks fail at or near the same time and try to reboot, the degradation of the performance of the application server is intensified. However, by having the SBC device 132 handle the registration process of the end user devices 110 associated with that SBC, the application server 140 would not become overwhelmed during the re-booting and may continue to provide the requested services of the other SBC devices associated with the application server. In this manner, incorporating the registrar 134 into the SBC 132 provides robustness to the network 200 not previously realized.

Figure 3:
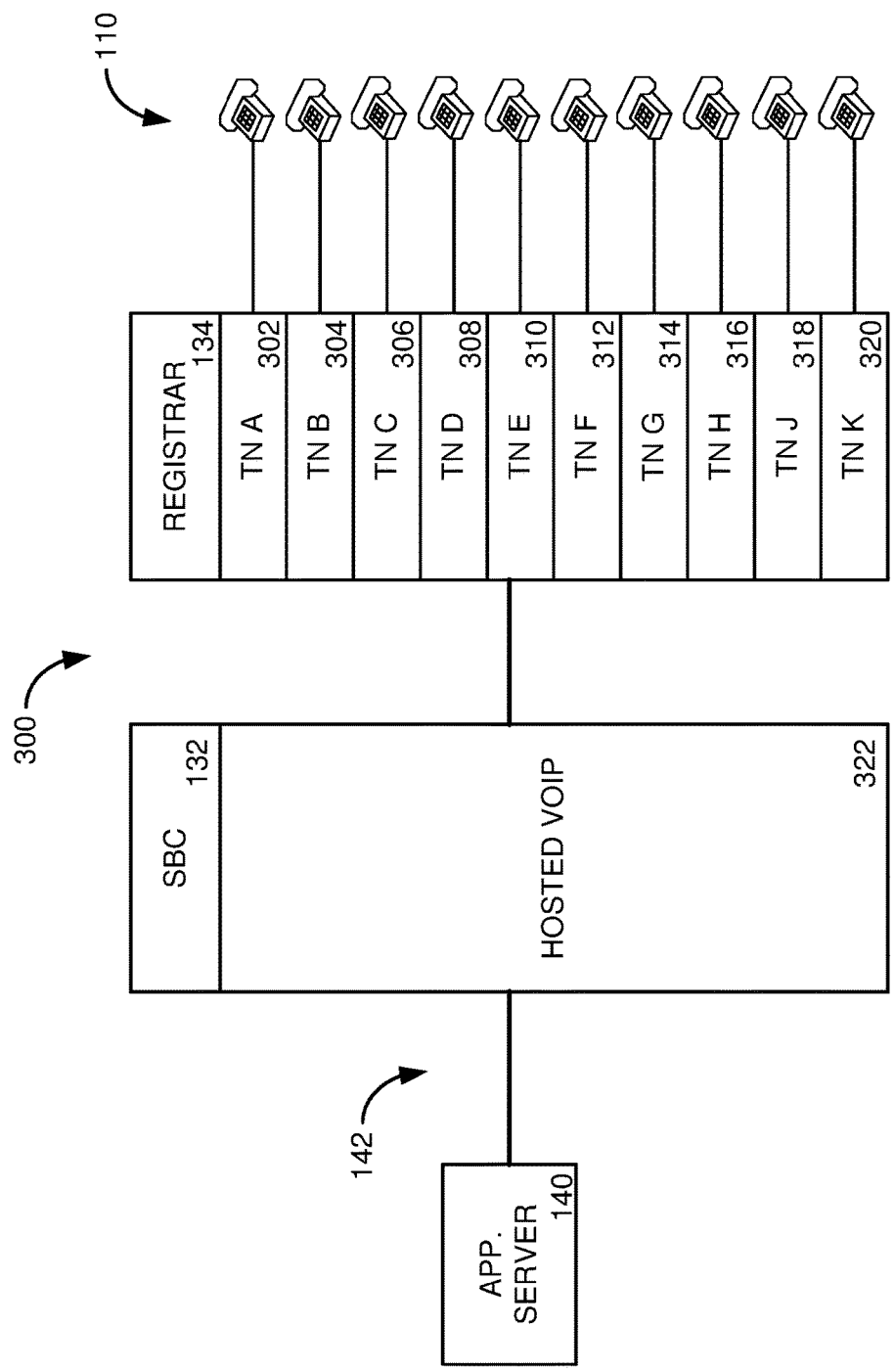
FIG. 3 is a schematic diagram illustrating a portion of a second exemplary VoIP network incorporating a session border controller unit configured to receive and manage registration messages from one or more endpoints to the network.

FIG. 3 is a schematic diagram illustrating a portion of a second exemplary VoIP network 300 incorporating a SBC unit 132 configured to receive and manage registration messages from one or more endpoints 110 to the network. The network 300 illustrated in FIG. 3 is similar to the network configuration of FIG. 2. As such, the network 300 includes an application server 140, an SBC 132 and associated registrar 134 and several end user devices 110 connected to the registrar through several TN's 302-320. However, in this configuration, the SBC 132 is not divided into dedicated customers with a particular number of TN's associated with each customer. Rather, the SBC 132 provides a hosted VoIP network 322 configuration where the several end user devices 110 can access the application server 140 through the TN's associated with the SBC. Each customer to the network 300 can then be identified by the TN and/or IP-address maintained by the registrar 134. Regardless of the configuration, the registration process and operations of the registrar 134 in a similar manner as in the configuration of the network 300 illustrated in FIG. 3, as described above.

Figure 4:
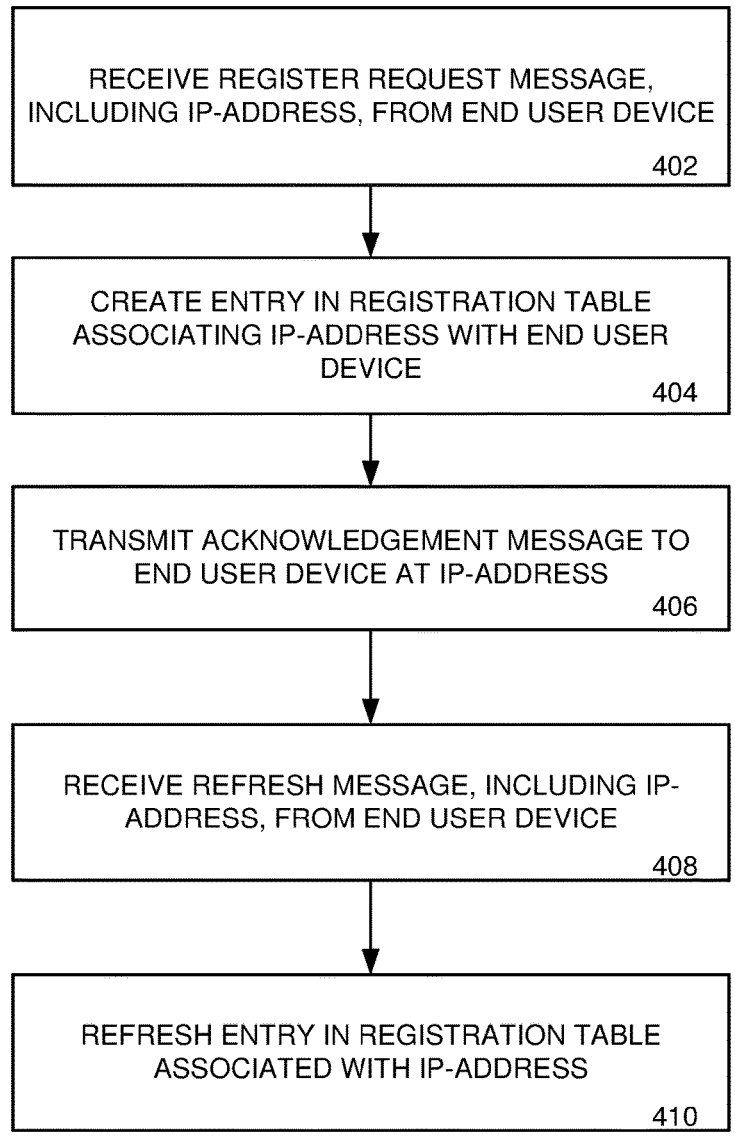
FIG. 4 is a flowchart illustrating a method for a session border controller to provide registrar functionalities for a telecommunications network.

FIG. 4 is a flowchart illustrating a method for a SBC to provide registrar functionalities for a telecommunications network. The operations described in relation to FIG. 4 are performed by a SBC or NTM, similar to those devices described above. Through the described operations, the SBC registers one or more end user devices to a network to facilitate proper routing of communications to the end user devices to and from the network.

Beginning in operation 402, the SBC device 132 receives a register request message from the end user device 110 associated with the network. In one particular embodiment, the register request message is a SIP-based message that includes an IP-address associated with the end user device 110 in a header of the register request message. In operation 404, the SBC 132 creates an entry into a registration table maintained by the SBC. In general, the registration table maintains an entry for each end user device 110 that transmits a register request message to the SBC 132. The registration table associates the IP-address or other identifier (such as a telephone number) contained in the request message header with each end user device 110. This IP-address or other identifier provides routing information for the network to provide communications and services to the end user device 110 from the network. In operation 406, the SBC 132 transmits one or more acknowledgement messages to the end user device 110 to establish the connection to the end user device.

As mentioned above, some registration tables may include an expiration value that creates a time limit to the duration of the registration such that expiration of the time limit causes the registrar to remove the registration entry in the registration table for an end user. Thus, the end user device 110 sends a periodic registration message to the registrar 134 to refresh the registration information maintained by the registrar. In operation 408, therefore, the SBC 132 receives one or more refresh messages from an end user device 110. The refresh message is identified as being transmitted from a particular end user device 110 by the inclusion of the associated IP-address of the end user device in the header of the refresh message. In operation 410, the SBC 132 refreshes the entry in the registration table for the entry corresponding to the received IP-address. In one example, the SBC 132 restarts the expiration value to refresh the entry for the IP-address and end user device 110. Thus, by performing the operations of FIG. 4, the SBC 132 of a network provides the registration functions for the network, thereby removing the need for the application server to perform such functions.

Figure 5:
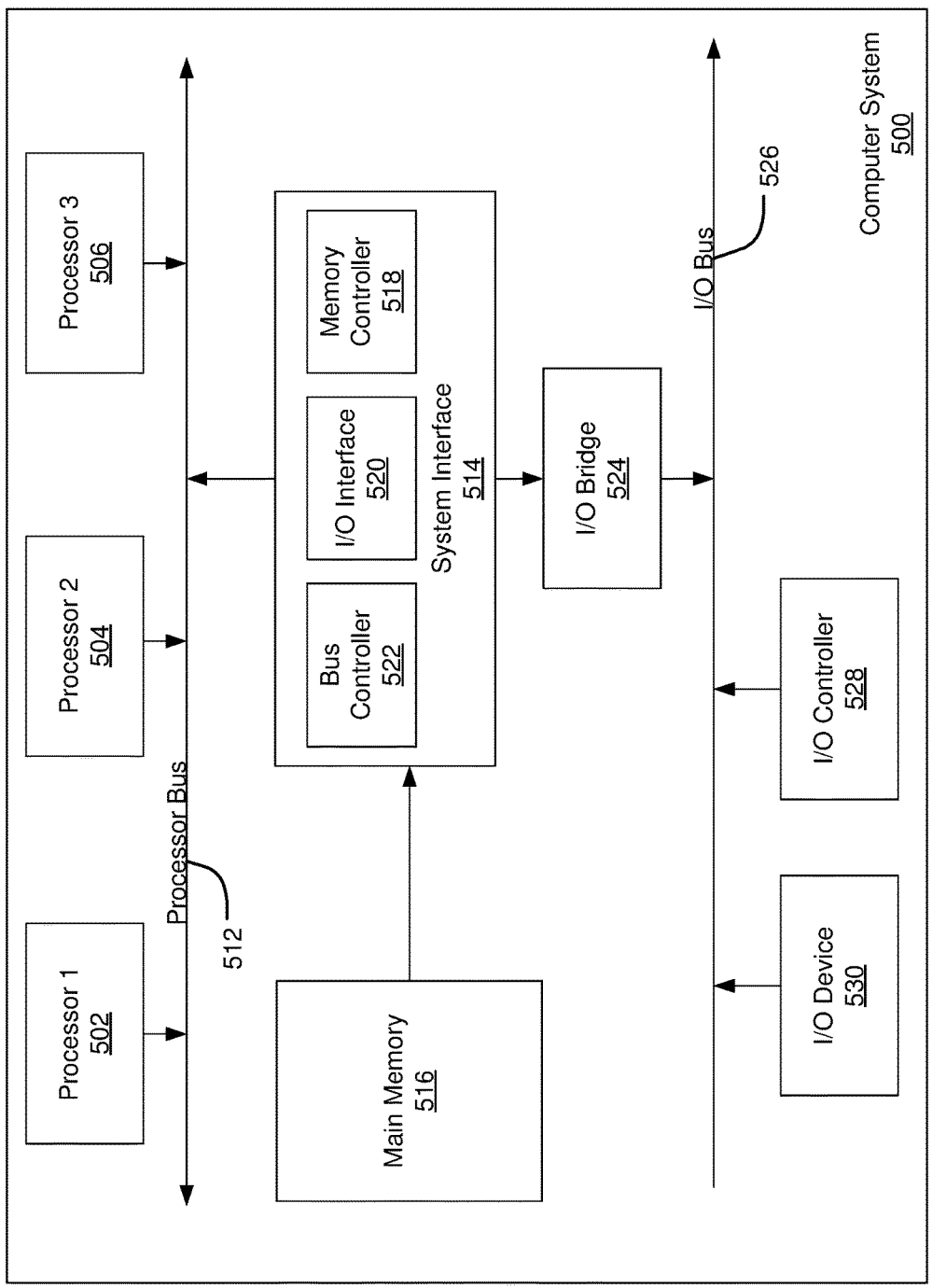
FIG. 5 is a diagram illustrating an example of a computing system which may be used in implementing embodiments of the present disclosure.

FIG. 5 is a block diagram illustrating an example of a computing device or computer system 500 which may be used in implementing the embodiments of the components of the network disclosed above. The computer system (system) includes one or more processors 502-506. Processors 502-506 may include one or more internal levels of cache (not shown) and a bus controller or bus interface unit to direct interaction with the processor bus 512. Processor bus 512, also known as the host bus or the front side bus, may be used to couple the processors 502-506 with the system interface 514. System interface 514 may be connected to the processor bus 512 to interface other components of the system 500 with the processor bus 512. For example, system interface 514 may include a memory controller 514 for interfacing a main memory 516 with the processor bus 512. The main memory 516 typically includes one or more memory cards and a control circuit (not shown). System interface 514 may also include an input/output (I/O) interface 520 to interface one or more I/O bridges or I/O devices with the processor bus 512. One or more I/O controllers and/or I/O devices may be connected with the I/O bus 526, such as I/O controller 528 and I/O device 540, as illustrated.

I/O device 540 may also include an input device (not shown), such as an alphanumeric input device, including alphanumeric and other keys for communicating information and/or command selections to the processors 502-506. Another type of user input device includes cursor control, such as a mouse, a trackball, or cursor direction keys for communicating direction information and command selections to the processors 502-506 and for controlling cursor movement on the display device.

System 500 may include a dynamic storage device, referred to as main memory 516, or a random access memory (RAM) or other computer-readable devices coupled to the processor bus 512 for storing information and instructions to be executed by the processors 502-506. Main memory 516 also may be used for storing temporary variables or other intermediate information during execution of instructions by the processors 502-506. System 500 may include a read only memory (ROM) and/or other static storage device coupled to the processor bus 512 for storing static information and instructions for the processors 502-506. The system set forth in FIG. 5 is but one possible example of a computer system that may employ or be configured in accordance with aspects of the present disclosure.

According to one embodiment, the above techniques may be performed by computer system 500 in response to processor 504 executing one or more sequences of one or more instructions contained in main memory 516. These instructions may be read into main memory 516 from another machine-readable medium, such as a storage device. Execution of the sequences of instructions contained in main memory 516 may cause processors 502-506 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 516. Common forms of machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

It should be noted that the flowchart of FIG. 4 is illustrative only. Alternative embodiments of the present disclosure may add operations, omit operations, or change the order of operations without affecting the spirit and scope of the present invention.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

I claim:

1. A system for transmitting one or more communications in a telecommunications network, the system comprising:

an application server configured to provide one or more services to at least one user of a telecommunications network, the at least one user associated with at least one end user device configured to transmit and receive communications from the telecommunications network;

a session border controller device in communication with the application server and the at least one end user device, wherein the session border controller device is divided to address each user; and a registrar module integrated into the session border controller device, the registrar module configured to receive one or more registration messages from that at least one end user device in communication with the session border controller device and register the at least one end user device with the telecommunications network, wherein the one or more registration messages are a Session Initiation Protocol (SIP) based registration message and the one or more registration messages comprise an Internet Protocol (IP) address associated with the at least one end user device, wherein the registrar module is further configured to transmit one or more acknowledgement messages to the at least one end user device upon receiving the one or more registration messages.

2. The system as recited in claim 1 wherein the registrar module is further configured to receive one or more refresh messages from the at least one end user device, the one or more refresh messages comprising the IP address associated with the at least one end user device.

3. The system as recited in claim 2 wherein the registrar module is further configured to refresh an expiration value associated with the at least one entry associated with the IP address of the at least one end user device upon receiving the one or more refresh messages.

4. The system as recited in claim 1 wherein the registrar module is further configured to maintain a registration table comprising at least one entry associating the IP address with the at least one end user device.

5. The system as recited in claim 1 wherein the application server provides the one or more services to the end user device at the IP address associated with the at least one end user device.

6. The system as recited in claim 1 wherein the application server is configured to receive one or more SIP-based invite messages and, in response, the registrar is configured to transmit one or more authentication messages to the at least one end user device.

7. The system as recited in claim 1 wherein the session border controller device is in communication with the application server through one or more trunk groups, wherein at least one trunk group of the one or more trunk groups supports a plurality of end user devices.

8. A method for transmitting one or more communications in a telecommunications network, the method comprising:
- by an application server, providing one or more services to at least one end user of a telecommunications network, the at least one end user associated with at least one end user device configured to transmit and receive communications from the telecommunications network;
- dividing a session border controller device to address each user, wherein the session border controller device is in communication with the application server and the at least one end user device; and
- by a registrar module integrated into the session border controller device:
  - receiving one or more registration messages from the at least one end user device in communication with the session border controller device;
  - registering the at least one end user device with the telecommunications network, wherein the one or more registration messages are a Session Initiation Protocol (SIP) based registration message and the one or more registration messages comprise an Internet Protocol (IP) address associated with the at least one end user device; and
  - transmitting one or more acknowledgement messages to the at least one end user device upon receiving the one or more registration messages.

9. The method as recited in claim 8, further comprising:
- by the registrar module, receiving one or more refresh messages from the at least one end user device, the one or more refresh messages comprising the IP address associated with the at least one end user device.

10. The method as recited in claim 9, further comprising:
- by the registrar module, refreshing an expiration value associated with the at least one entry associated with the IP address of the at least one end user device upon receiving the one or more refresh messages.

11. The method as recited in claim 8, further comprising:
- by the registrar module, maintaining a registration table comprising at least one entry associating the IP address with the at least one end user device.

12. The method as recited in claim 8, further comprising:
- by the application server, providing the one or more services to the end user device at the IP address associated with the at least one end user device.

13. The method as recited in claim 8, further comprising:
- by the application server, receiving one or more SIP-based invite messages; and
- in response, by the registrar module, transmitting one or more authentication messages to the at least one end user device.

14. The method as recited in claim 8 wherein the session border controller device is in communication with the application server through one or more trunk groups, wherein at least one trunk group of the one or more trunk groups supports a plurality of end user devices.

* * * * *